(12) United States Patent
Wiegandt et al.

(10) Patent No.: US 11,994,174 B1
(45) Date of Patent: May 28, 2024

(54) CLUTCH ASSEMBLY

(71) Applicant: GKN Auotmotive Limited, Birmingham (GB)

(72) Inventors: Markus Wiegandt, Cologne (DE); Eduard Kinzel, Cologne (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/552,939

(22) PCT Filed: Mar. 30, 2021

(86) PCT No.: PCT/EP2021/058292
§ 371 (c)(1),
(2) Date: Sep. 28, 2023

(87) PCT Pub. No.: WO2022/207079
PCT Pub. Date: Oct. 6, 2022

(51) Int. Cl.
*F16D 48/02* (2006.01)
*F16D 13/72* (2006.01)
*F16D 13/74* (2006.01)

(52) U.S. Cl.
CPC .............. *F16D 25/14* (2013.01); *F16D 13/72* (2013.01); *F16D 13/74* (2013.01); *F16D 48/02* (2013.01)

(58) Field of Classification Search
CPC .......... F16D 25/14; F16D 13/72; F16D 13/74; F16D 48/02; F16H 57/04
See application file for complete search history.

(56) References Cited

U.S. PATENT DOCUMENTS

| | | | |
|---|---|---|---|
| 2005/0145460 A1* | 7/2005 | Forsyth | B60K 17/34 192/48.606 |
| 2009/0038908 A1* | 2/2009 | Quehenberger | F16D 25/0638 192/85.42 |
| 2009/0212932 A1* | 8/2009 | Cho | F16D 48/066 701/67 |
| 2010/0094519 A1 | 4/2010 | Quehenberger et al. | |

(Continued)

FOREIGN PATENT DOCUMENTS

| | | |
|---|---|---|
| DE | 102008009653 A1 | 9/2008 |
| DE | 102009005378 A1 | 4/2010 |

(Continued)

OTHER PUBLICATIONS

International Search Report and Written Opinion for PCT/EP2021/058292 mailed Jan. 12, 2022 (11 pages; with English translation).

*Primary Examiner* — Lori Wu
(74) *Attorney, Agent, or Firm* — Bejin Bieneman PLC

(57) ABSTRACT

A clutch assembly comprises at least one controllable friction clutch for variable torque transmission between a clutch input part and a clutch output part; a hydraulic actuator assembly for actuating the friction clutch, the actuator assembly comprising a hydraulic pump, a hydraulic chamber in which hydraulic pressure for the friction clutch is built up by the hydraulic pump and a return flow element with an orifice, via which hydraulic fluid can flow out of the hydraulic chamber into a housing reservoir when the hydraulic pump is not actuated, wherein the hydraulic fluid defines a filling level in the housing reservoir; wherein an outlet opening of the return flow element lies below the filling level of the hydraulic fluid in a inactive state.

17 Claims, 4 Drawing Sheets

(56) References Cited

U.S. PATENT DOCUMENTS

| | | | | |
|---|---|---|---|---|
| 2010/0122887 A1* | 5/2010 | Pritchard | .............. | F16D 29/005 |
| | | | | 192/70.12 |
| 2014/0231211 A1* | 8/2014 | Nett | ................... | F16H 57/0471 |
| | | | | 192/113.1 |
| 2021/0010568 A1* | 1/2021 | Haupt | ................ | B60K 17/3462 |
| 2021/0324921 A1* | 10/2021 | Kubo | ...................... | F16D 25/10 |

FOREIGN PATENT DOCUMENTS

| | | | |
|---|---|---|---|
| EP | 1253341 | A2 | 10/2002 |
| EP | 1281560 | A2 | 2/2003 |
| JP | S5891929 | A | 6/1983 |
| WO | 2010081743 | A1 | 7/2010 |
| WO | 2016127994 | A1 | 8/2016 |
| WO | 2017157479 | A1 | 9/2017 |
| WO | 2019174716 | A9 | 9/2019 |

\* cited by examiner

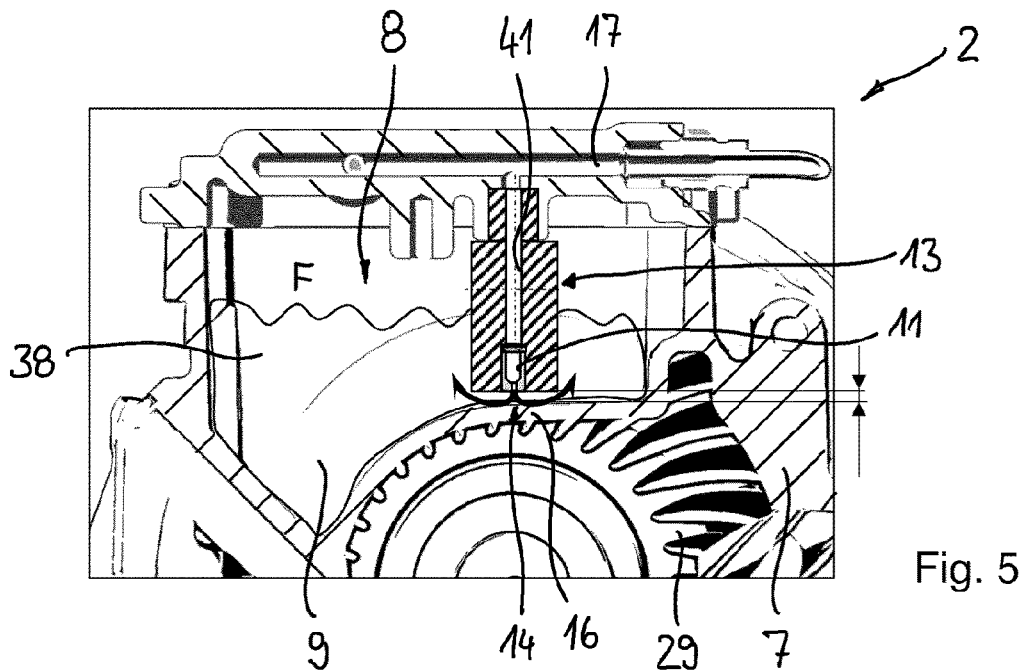
Fig. 5
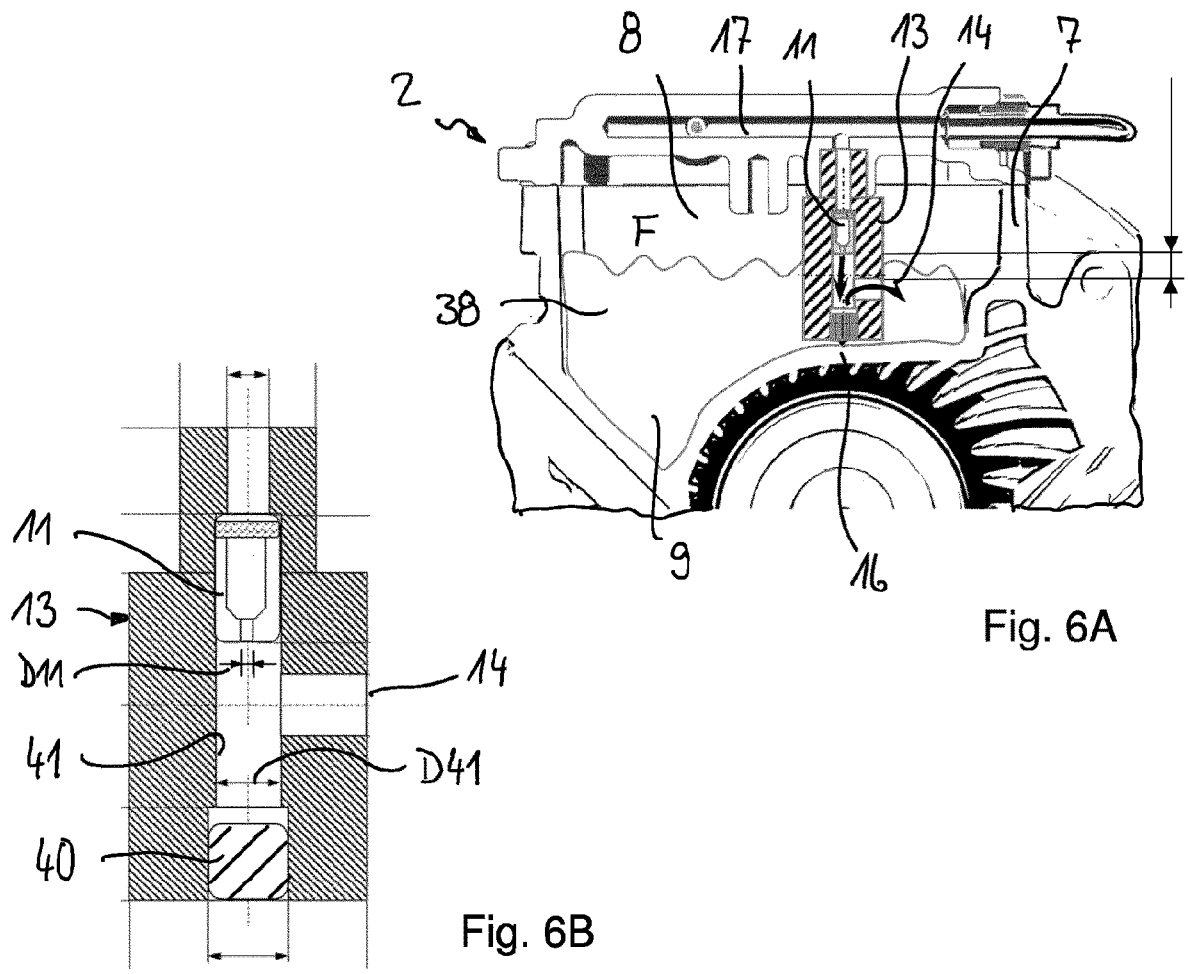
Fig. 6A
Fig. 6B

CLUTCH ASSEMBLY

CROSS-REFERENCE TO RELATED APPLICATIONS

This application is a national stage of, and as such claims priority to, Patent Cooperation Treaty Application No. PCT/EP2021/058292, filed on Mar. 30, 2021, which application is hereby incorporated herein by reference in its entirety.

BACKGROUND

From EP 1 281 560 A2, an axle module with two separate friction disk clutches is known. An angle drive is provided for torque input, which rotationally drives a hollow shaft. The friction disk clutches are arranged at the ends of the hollow shaft and can each be actuated by a ball ramp assembly controllable by an electric motor.

From US 2010/0094519 A1, corresponding to DE 10 2009 005 378 A1, a four-wheel driveline of a motor vehicle with a permanently driven front axle and a selectively drivable rear axle is known. Torque is distributed between the front axle and the rear axle via a transfer case with a friction disk clutch, which is controllable by an electronic control unit, and a propeller shaft. At the rear axle, the torque introduced can be transmitted to the two side shafts by means of second friction disk clutches.

From WO 2010 081743 A1, a hydraulic actuating assembly for hang-on connection of a drive axle in the driveline of a motor vehicle. The actuating assembly comprises a pump for generating a hydraulic pressure, a pressure accumulator and two hydraulic actuation units, each for actuating an associated clutch.

An electric drive for driving a drive axle of a motor vehicle is known from WO 2017 157479 A1. The electric drive comprises an electric machine, a transmission unit and a double clutch unit. The double clutch unit comprises two disk packs which can be actuated separately by means of respective hydraulic actuators in order to transmit torque to a respective side shaft.

From WO 2019/174716 A9, a driveline with an electric motor and two side shafts is known, each having a controllable friction clutch for controlling the transmittable torque.

In hydraulic actuator systems, the necessary volume flow can be realised by a motor-pump unit by means of speed control or current control of the motor. Systems with speed control are used in particular in units marketed by the applicant under the designation "Booster Rear Drive Unit" or "Twin AWD". Current-controlled systems are used in particular in units marketed by the applicant under the designation "Twinster". Depending on the design of the hydraulic control system, fluctuations in hydraulic pressure may occur due to foaming in the hydraulic fluid. This can lead to inaccuracies in the torque distribution in the driveline of the motor vehicle.

SUMMARY

The present disclosure relates to a hydraulically operable clutch assembly, in particular for a driveline of a motor vehicle. The hydraulically actuated clutch assembly can be provided for torque transmission in the driveline of a motor vehicle, with which precise torque adjustment may be achieved even during prolonged actuation.

As described herein, a clutch assembly, in particular for the driveline of a motor vehicle, comprises: at least one controllable friction clutch having a clutch input part and a clutch output part; a hydraulic actuator assembly having a hydraulic pump, a hydraulic chamber connected thereto and in which a hydraulic pressure can be built up by the hydraulic pump in order to act on the controllable friction clutch, and a return flow element having an orifice, via which hydraulic fluid can flow out of the hydraulic chamber into a reservoir, wherein the hydraulic fluid defines a filling level in the reservoir in the, i.e., inactive, state; wherein an outlet opening of the return flow element is below the filling level of the hydraulic fluid in the inactive state.

An advantage of the clutch assembly is that due to the design of the hydraulic system with return flow element and orifice plate, a foaming tendency of the hydraulic fluid is reduced, so that with a constantly driven pump, the hydraulic pressure remains at least largely constant. In this way, the actuation force of the friction clutch can be precisely dosed even in the case of prolonged actuation, and/or the set torque to be transmitted can be maintained without a drop in pressure. Overall, this results in precise and targeted torque adjustment on the associated driveline for the clutch assembly and correspondingly high driving stability even during prolonged actuation of the clutch.

A clutch assembly with controllable friction clutch can be used in a driveline of a motor vehicle to transmit torque as needed and depending on a driving situation to a driveline downstream in the power path. In this context, the friction clutch can be operated by the actuator to an open position in which no torque is transmitted, a closed position in which full torque is transmitted, and intermediate positions for variable torque transmission. For example, such a clutch assembly may include a clutch to transmit torque as required to a downstream drive axle or within a drive axle. A clutch assembly can also be configured with two clutches to distribute torque in a drive axle to two side shafts and/or to adjust the torque amount.

According to an embodiment, a lubricant is provided for lubricating and/or cooling the controllable friction clutch (es), wherein the lubricant of the friction clutch(es) and the hydraulic fluid of the actuator assembly are different, hydraulically separated fluids. The hydraulic system for lubricating and cooling the friction clutch(es) and the hydraulic system for actuating the friction clutch(es) are separate from each other and the corresponding hydraulic chambers are sealed against each other.

The hydraulic fluid contained in the reservoir of the actuator assembly in the resting state can be, for example, less than 400 ml (milliliters) and/or more than 200 ml. The hydraulic chamber or reservoir can be formed tapered downwards in the installed state of the clutch assembly. A horizontal cross-sectional area in a lower region of the reservoir may be smaller than a horizontal cross-sectional area in an upper region of the reservoir. The intake area of the hydraulic pump can be located at a lowest point of the hydraulic system, so that a safe hydraulic pumping action is always ensured even when the motor vehicle is tilted. The outlet opening of the return flow element can open in the lower area of the reservoir and/or preferably at least 10 mm below the filling level of the hydraulic fluid in the installed state when the vehicle is standing on a straight and/or inclined plane.

The hydraulic pump can be a unidirectional pump which can be driven in one direction of rotation to supply hydraulic fluid. When the pump is switched off, the hydraulic system becomes pressureless and the hydraulic fluid can flow off via the orifice and the return flow channel into the pressureless housing chamber. Alternatively, the hydraulic pump can be a bidirectionally operating pump which, when driven in a first direction of rotation, delivers hydraulic fluid from the reservoir to the friction clutch in order to pressurise it in the closing direction and, when driven in a second direction of rotation, delivers hydraulic fluid from the friction clutch back into the reservoir in order to open the friction clutch.

In an embodiment, the return flow element can be connected to an upper housing portion or a return flow line formed therein, so that the fluid can flow out of the chamber downwards into the return flow element and therethrough into the pressureless housing portion or reservoir below. In this case, there is a high pressure in the hydraulic chamber with which the hydraulic fluid flows into the return flow element. A baffle can be provided in the reservoir against which hydraulic fluid flowing out of the return flow element at high flow velocity can impact, so that the foaming tendency is minimised. The hydraulic energy present upstream the orifice plate in the form of high pressure is converted by the orifice plate into a high flow velocity. The hydraulic fluid hits the baffle at high speed, where there is a quasi-pressureless condition or ambient pressure of the reservoir.

The return flow element can be formed sleeve-like or tubular. The outlet opening and/or the channel of the return flow element can have a diameter that is at least six times as large as the smallest opening diameter of the orifice. The flow velocity through the return flow element may be less than or equal to 30 m/s (meters per second). The pressure drop between the inlet opening and the outlet opening of the return flow element can be less than 5 bar, for example.

According to a possible embodiment, the return flow element may have a lateral outlet opening, wherein a bore axis of the lateral opening may include an angle between 45° and 135° with a longitudinal axis of the tubular return flow element. In this implementation, the free end of the return flow element may be closed. For this purpose, a closure can be provided at the return flow element against which the inflowing hydraulic fluid impacts at a high flow velocity in order to then flow out through the lateral opening at a lower flow velocity. In this embodiment, the orifice may be located close to the upper housing portion arranged thereabove, so that the fluid flows through the orifice into the channel.

According to an alternative embodiment, the return flow element can have an end-side outlet opening with a bore in which the orifice is arranged, i.e., remote from the upper housing portion arranged thereabove. A side opening is not provided in this example. In this implementation, the outlet opening of the return flow element can be aligned in the direction towards a housing wall in the reservoir, which acts as a baffle plate. The distance between the outlet opening and the housing wall can be between 1 mm (millimeters) and 5 mm.

The length of the channel can be at least twice as long as the diameter of the channel and/or of the outlet opening. For example, the diameter of the channel can be between 3.5 mm and 10 mm.

The hydraulic pump can be designed to generate a hydraulic pressure of more than 25 bar.

An exemplary embodiment to distribute torque introduced from a propeller drive shaft to two side shafts can comprise an angle drive with a pinion drivable by the propeller drive shaft and a ring gear meshing therewith, which can be arranged coaxially to the two friction clutches. A first friction clutch is provided for transmitting a first torque to a first side shaft, and a second friction clutch is provided for transmitting a second torque to a second side shaft. In this implementation, the orifice is used as an actuator in the hydraulic system, wherein the pressure generated by the pump and the orifice acts equally on both clutches. In this way, both clutches transmit torque so that a cross-locking function is effected between the two side shafts.

Particularly in consideration of the cross-locking function of a "Twin AWD" unit (Twin All Wheel Drive Unit), especially in case of a longer constant rotary speed of the actuator motor (input value), a constant hydraulic pressure is needed as output value. The clutch assembly is well suited for such applications, as the hydraulic pressure can be kept constant. In this way, the actuating forces acting on the two friction clutches and thus the torque to be transmitted can also be kept constant. A pressure drop in the hydraulic system when operating the actuator motor at constant speed is effectively avoided.

BRIEF SUMMARY OF THE DRAWINGS

Examples of embodiments are explained below with reference to the drawing figures. Herein:

FIG. 5 shows an assembly in a further modified embodiment in a sectional view;

FIG. 6A shows an assembly in a further modified embodiment in a sectional view;

FIG. 6B shows the return flow element from FIG. 6A as a detail in an enlarged view.

DESCRIPTION

Figure 1:
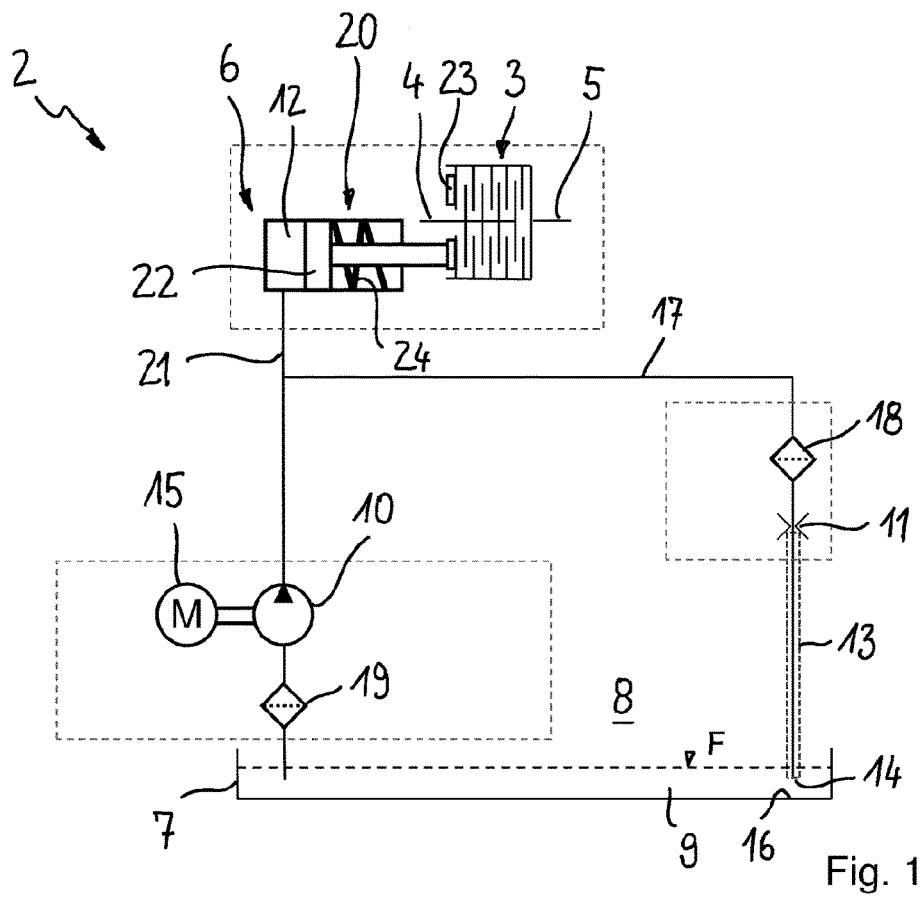
FIG. 1 shows an example assembly in a schematic representation.
Figure 2:
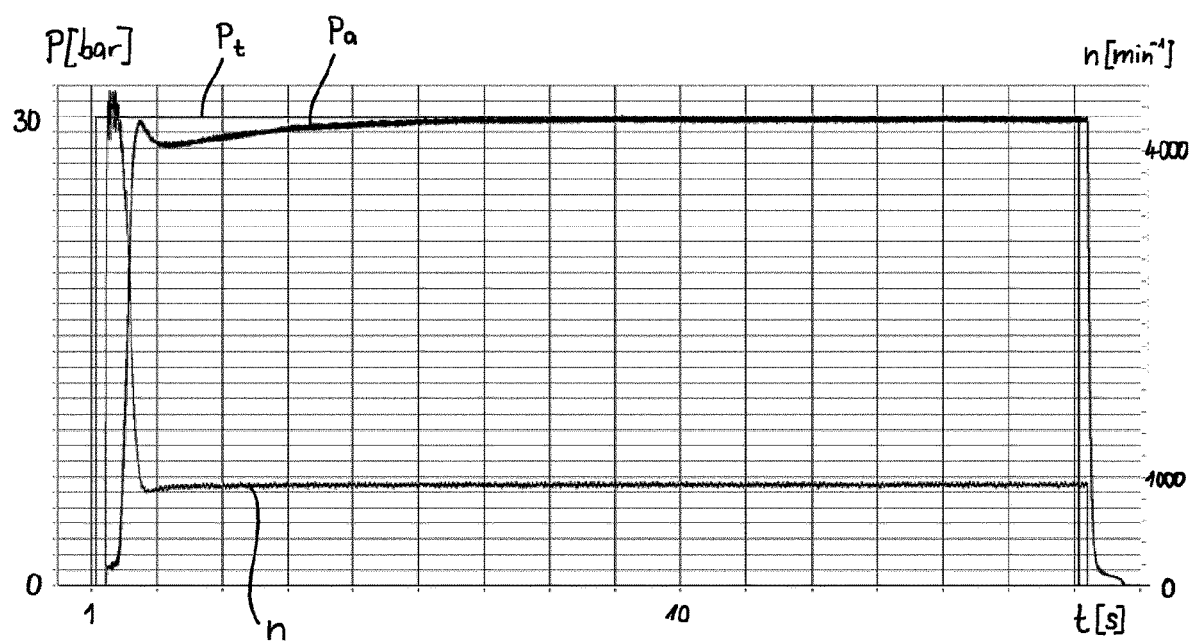
FIG. 2 shows a diagram of an exemplary pressure curve over time when the assembly according to FIG. 1 is actuated.

FIG. 1 shows a clutch assembly 2 in a first embodiment, wherein FIG. 2 shows a diagram with an exemplary pressure curve of such a clutch assembly. The two Figures are described together below.

The clutch assembly 2 comprises a controllable friction clutch 3 for transmitting torque between a clutch input part 4 and a clutch output part 5, a hydraulic actuator assembly 6 for actuating and/or controlling the friction clutch 3 and a housing 7 in which a reservoir 8 is filled with a hydraulic fluid 9. Such a clutch assembly 2 with controllable friction clutch 3 can be used in the driveline of a motor vehicle to transmit torque as required and according to the driving situation to a driveline downstream in the power path.

The actuator assembly 6 comprises a hydraulic pump 10, a hydraulic chamber 12 in which, when the hydraulic pump is actuated, a hydraulic pressure is built up for acting on the controllable friction clutch 3, and a return flow element 13 with an orifice 11. The return flow element 13 is hydraulically connected to the hydraulic chamber 12 so that the fluid can flow out of the chamber through the return flow element into the underlying pressureless housing space respectively reservoir 8. The outlet opening 14 of the return flow element 13 lies below the filling level F of the hydraulic fluid 9. Optionally, a housing wall 16 can be provided against which hydraulic fluid flowing out of the return flow element 13 at a high flow rate can impact. In this way, a particularly low foaming tendency is achieved.

FIG. 2 shows an exemplary pressure curve Pa over time t of an assembly according to the invention. It can be seen that when the pump 10 is activated and/or the speed n increases abruptly, the pressure build-up from pressure 0 to the target pressure Pt takes place very quickly, typically within a time window that can be less than 200 milliseconds. It can also be seen that the pressure Pa remains stable or almost constant at constant rotary speed n after the target pressure Pt has been reached quickly and does not drop over time t. There are no uncontrolled pressure drops which could result from air bubbles in the oil.

Further details of the hydraulic assembly are described below, which are optional. A filter 18 can be provided in the line 17 between actuator 6 and orifice 11. The pressure in front of orifice 11 is higher than the pressure behind it in the direction of flow. The return flow element 13 may be configured sleeve-shaped and/or tubular, wherein the opening diameter of the orifice 11 is smaller than an inner diameter of the return flow element 13 and/or its outlet opening 14 typically smaller than one sixth of the inner diameter. The flow velocity through the return flow element can, for example, be less than or equal to 30 m/s. The pressure drop between the inlet opening and the outlet opening of the return flow element can be less than 5 bar, for example. The hydraulic actuator assembly 6 may be designed for a total volume of hydraulic fluid, which may be, for example, less than 400 ml and more than 200 ml in the reservoir 8 when at rest.

The hydraulic pump 10 is a unidirectional pump which can be driven by a controllable motor 15 in one direction of rotation in order to convey hydraulic fluid from the oil sump to the hydraulic chamber 12. The necessary volume flow can be achieved by controlling the speed of the pump motor 15. A filter 19 can be provided in the supply line between the oil sump and the pump 10. When the pump 10 is switched off, the hydraulic system is depressurised and the hydraulic fluid 9 can flow off via the orifice 11 and the return flow channel 13 into the depressurised reservoir 8 respectively oil sump. In addition, oil can also flow out via the pump 10, namely in that the back pressure present in the system passively turns the pump backwards after it has been switched off and the oil flows back against the active pumping direction. The unit including pump 10 and motor 15 can also be referred to as a motor-pump unit. However, a design without a separate drive is also possible, for example, in which the pump is passively driven via a rotating drive shaft in the vehicle's driveline. According to a further embodiment not shown here, the hydraulic pump can also be designed as a bidirectionally operating pump which, when driven in a first direction of rotation, delivers hydraulic fluid into the hydraulic chamber 12 in order to actuate the clutch 3 in the closing direction and, when driven in an opposite direction of rotation, delivers hydraulic fluid from the hydraulic chamber 12 in order to actuate the clutch 3 in the opening direction.

The actuator assembly 6 may further comprise a piston-cylinder unit 20 with a hydraulic chamber 12 and a setting piston 22 slidably arranged in the hydraulic chamber 12. The setting piston 22 is connected to an pressure member 23 of the friction clutch 3. By pressurising the hydraulic chamber 12, the piston 22 is moved in the direction of the pressure member 23 so that the clutch transmits torque. The desired torque can be variably adjusted as required via the hydraulic pressure generated by the pump 10. In the present case, the piston-cylinder unit comprises a spring 24 which acts on the piston 22 against the hydraulic force of the pump 10, respectively which is preloaded against the piston. When the pump 10 is switched off, the spring 24 forces the piston 22 in the direction of the hydraulic chamber 12 so that the clutch 3 is opened again.

Figure 3:
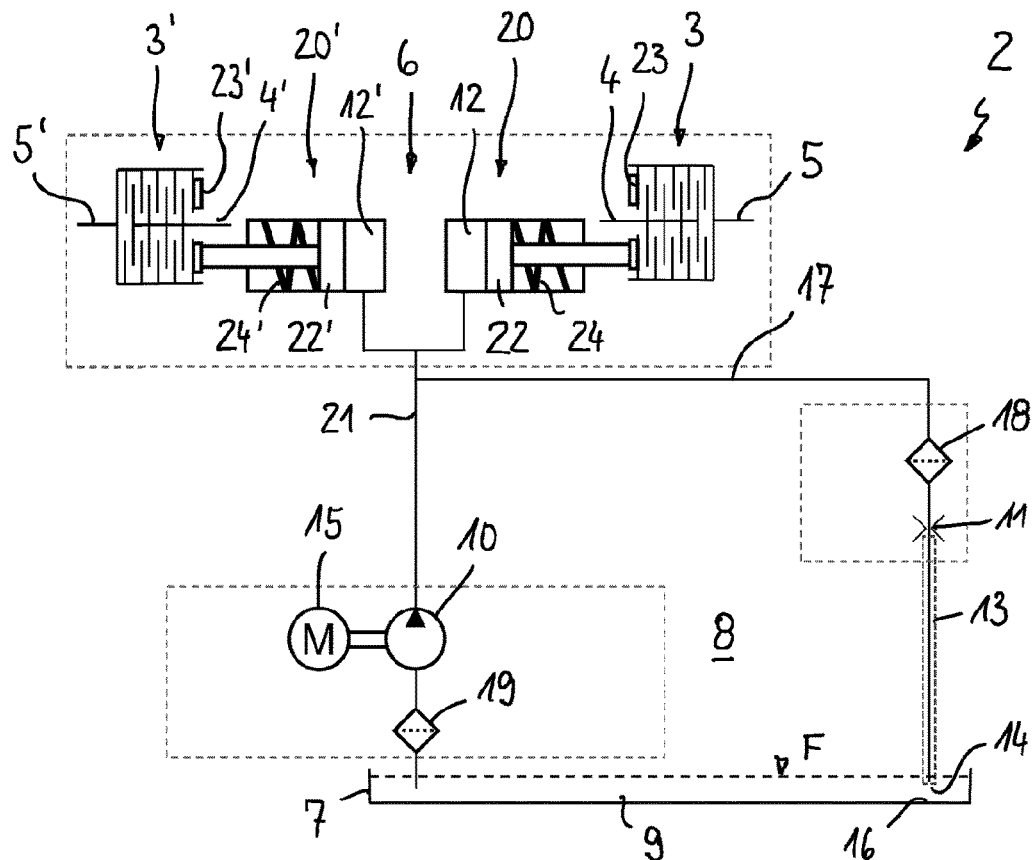
FIG. 3 shows an assembly in a schematic representation in a modified embodiment.

FIG. 3 shows a clutch assembly 2 in a slightly modified implementation which largely corresponds to that in FIG. 1. In this respect, reference can be made to the above description with regard to the similarities. The same and/or corresponding details are marked with the same reference signs. The only difference is that the actuator assembly 6 in the embodiment according to FIG. 2 has a second setting unit 20' for actuating a second clutch 3'. The two setting units 20, 20' are both hydraulically connected to the pump 10 which can supply them with hydraulic pressure. A clutch assembly 2 with two friction clutches 3, 3' can be used in a power distribution unit for transmitting torque from an input shaft to two output shafts. In this case, the two setting units 20, 20' of the two clutches 3, 3' are pressurised with the same pressure so that the same torque is applied to both side shafts.

Figure 4A:
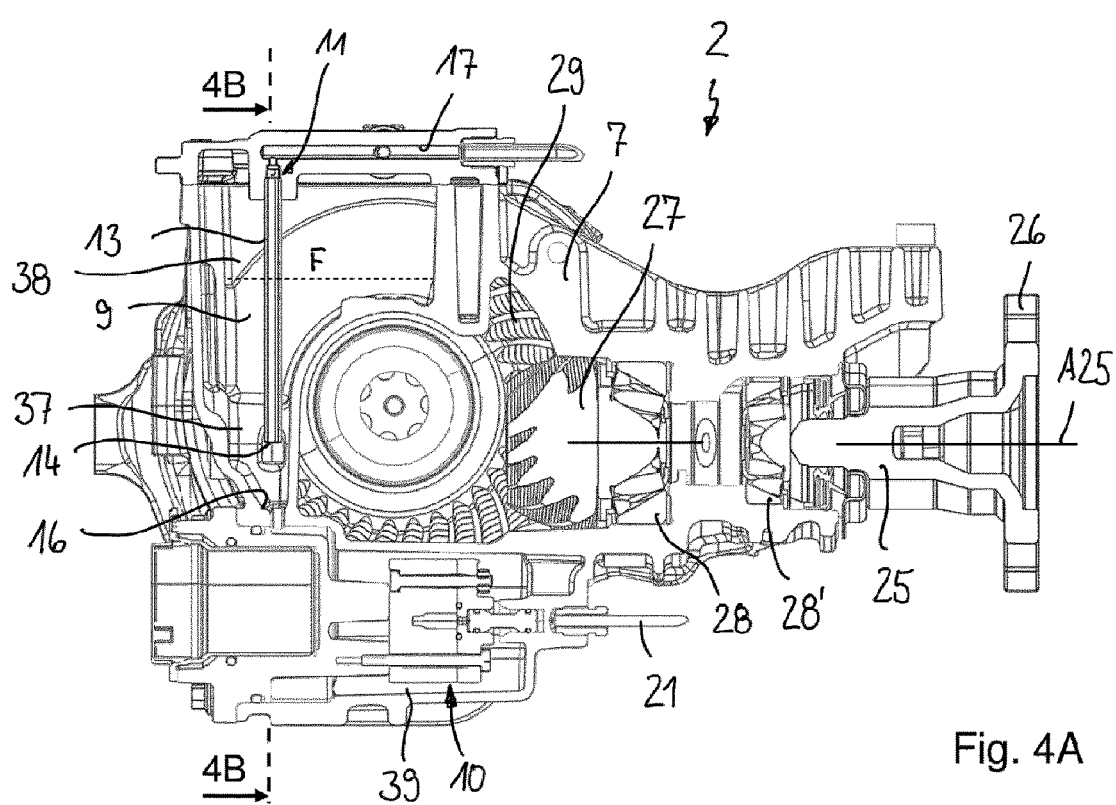
FIG. 4A shows an assembly in a further embodiment according to section line 4A-4A of FIG. 4B.
Figure 4B:
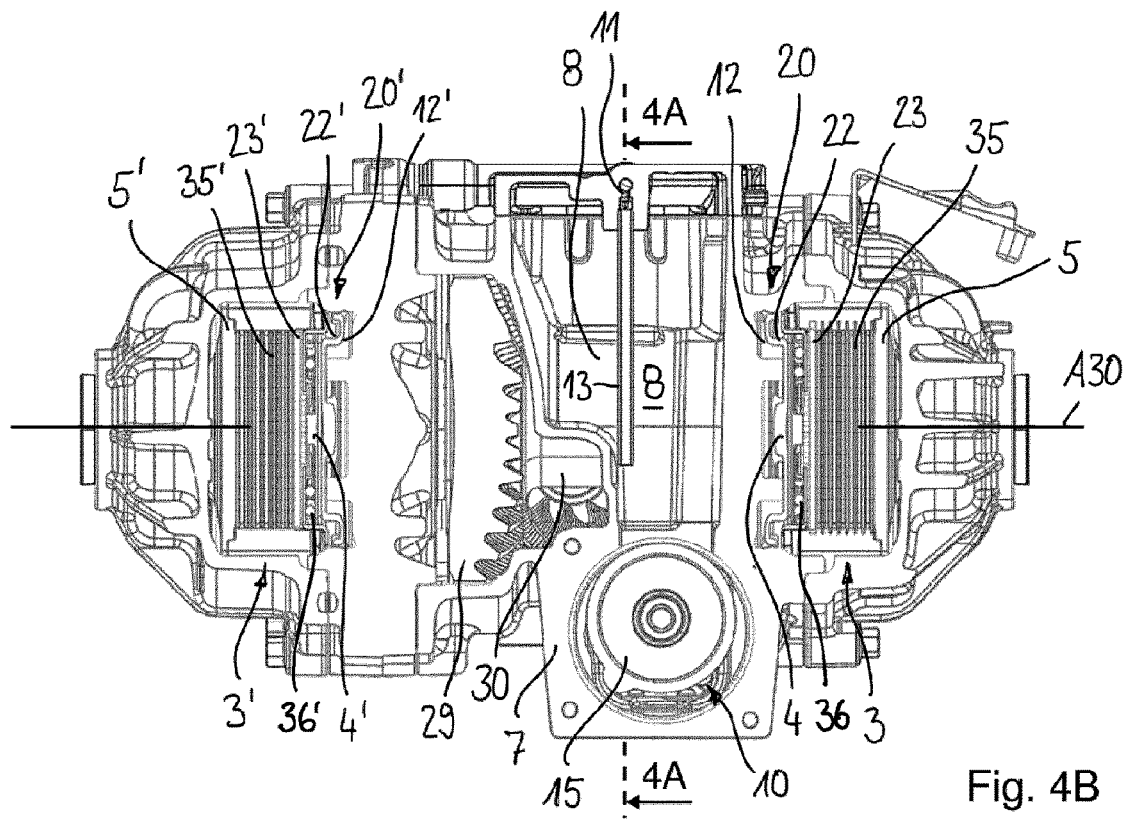
FIG. 4B shows the assembly from FIG. 4A according to section line 4B-4B.
Figure 4C:
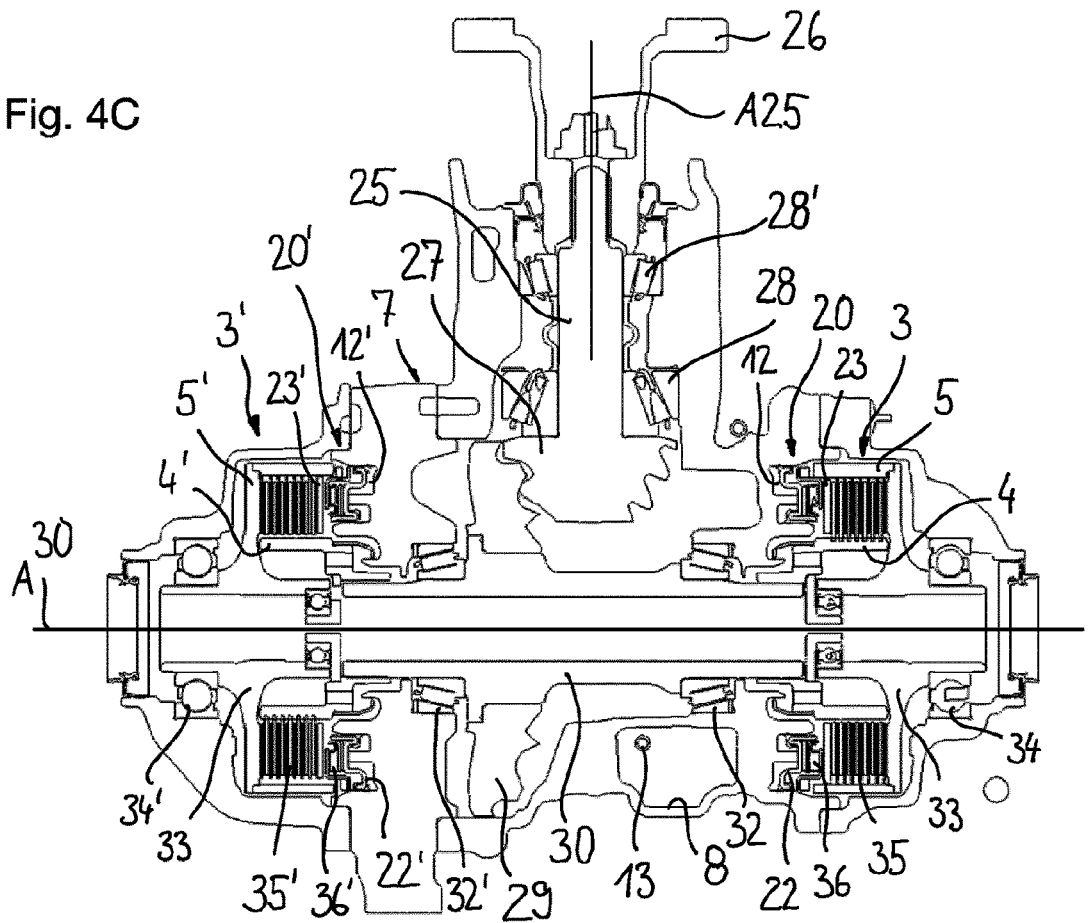
FIG. 4C shows the assembly from FIGS. 4A and 4B in a sectional plane through the shaft axes.

FIGS. 4A to 4C show a clutch assembly 2 in a further embodiment, which largely corresponds to the schematic embodiment according to FIG. 3. Thus, reference is made to the above description with regard to the similarities, wherein the same and/or corresponding details are provided with the same reference signs.

The assembly shown in FIGS. 4A to 4C comprises an input shaft 25 with a connecting element 26 for introducing a torque and a drive pinion 27 for driving an intermediate shaft. The input shaft 25 is rotatably mounted in the housing 7 by bearing means 28, 28' about an axis of rotation A25. The pinion 27 meshes with a ring gear 29, which is connected to the intermediate shaft 30 in a rotationally fixed manner. The pinion and ring gear together form an angle drive. The intermediate shaft 30 is supported by bearing means 32, 32' so as to be rotatable about an axis of rotation A30 which crosses the axis of rotation A25 of the input shaft at a distance. A first end of the intermediate shaft 30 is drivingly connected to a first controllable friction clutch 3 for transmitting torque to a first side shaft (not shown). The second end of the intermediate shaft 30 is drivingly connected to a second controllable friction clutch 3' for driving the second side shaft (not shown). The clutches 3, 3' have the same design and function, which is why only one of them is described below.

The friction clutch 3, 3' has a clutch input part 4, 4', which is connected to the intermediate shaft 30 in a rotationally fixed manner, and a clutch output part 5, 5', which is to be connected to the associated side shaft for torque transmission, as well as a disk pack 35, 35' for transmitting torque between the input part and the output part. The disk packs 35, 35' each comprise inner disks which are rotationally fixed and axially movable with respect to the clutch input part 4, 4', and outer disks which are rotationally fixed and axially movable with respect to the clutch output part 5, 5', with the inner and outer disks being arranged axially alternately. The clutch output parts 5, 5' are designed as a clutch case respectively outer plate carrier with a shaft portion 33, 33', which is rotatably mounted in the housing 7 via respective bearing means 34, 34'.

Each of the two clutches 3, 3' can be actuated by an associated setting unit 20, 20', which are jointly hydraulically actuated by the pump 10. As the same hydraulic pressure is applied to both setting units 20, 20', both clutches 3, 3' transmit the same torque to the respective side shaft.

The two setting units 20, 20' have the same design and function, which is why both are described together below.

The setting units 20, 20' are functionally configured similar as shown schematically in FIGS. 1 and 3. They are hydraulically actuatable and each comprise an annular piston 22, 22' which is axially displaceably arranged in an associated annular hydraulic chamber 12, 12' of the housing 7. The hydraulic chambers 12, 12' are hydraulically connected to the pump 10 via respective lines 21 so that when the pump is actuated a hydraulic pressure can be generated in the hydraulic chambers 12, 12' so that the piston 22, 22' seated therein is moved axially in the direction towards the side shaft. The axial forces transmitted by the pistons 22, 22' are transmitted to the associated pressure member 23, 23' via an axial bearing 36, 36'. The axial bearings 36, 36' serve to rotationally decouple the pressure members 23, 23' rotating with the clutch output part 5, 5' from the setting units 20, 20' respectively pistons 22, 22' arranged stationarily in the housing 7. Return springs 24, 24' can be provided for resetting the actuators 6, 6' respectively the pistons 22, 22'. The return springs 24, 24' are arranged such that they axially load the piston 22, 22' away from the disk pack 25, 25' when the actuator is not actuated, so that the respective clutch 3, 3' is opened.

If the pump 10 is switched off, the pressure in the hydraulic chambers 12, 12' drops and the hydraulic fluid flows back into the reservoir 8 via the line 17 and the return flow element 13. It can be seen in FIG. 4A that the reservoir 8 in the installed state of the clutch assembly 2 has a downwardly tapering region 37 in which the outlet opening 14 of the return flow element 13 is arranged. A horizontal cross-sectional area in this lower region 37 of the housing space 8 is smaller than a horizontal cross-sectional area in an upper region 38 of the housing space. In the installed state, the outlet opening 14 of the return flow element is at least 10 mm, preferably at least 20 mm, below the filling level F of the hydraulic fluid. Furthermore, the outlet opening 14 is directed towards an opposite baffle wall 16, so that the outflowing hydraulic fluid is calmed. The intake region 39 of the hydraulic pump 10 is located at a lowest point of the hydraulic system, so that a safe hydraulic pumping action is always ensured even when the motor vehicle is tilted. The volume of hydraulic fluid in the reservoir 8 can be less than 400 ml and more than 200 ml.

In the present embodiment, the orifice 11 is arranged in an upper portion of the return flow element 13 close to the upper housing portion and/or close to the line 17 formed therein and leading to the orifice 11 and/or to the setting units 20, 20'. The orifice diameter of the orifice 11 is considerably smaller than the inner diameter of the return flow element 13 and/or its outlet opening 14, for example smaller than one sixth of the inner diameter. The flow speed of the hydraulic fluid through the downstream return flow element 13 can be less than 30 m/s, wherein the pressure drop between the inlet opening and the outlet opening of the return flow element can be less than 5 bar.

FIG. 5 shows a clutch assembly 2 in a modified embodiment which largely corresponds to the embodiment according to FIGS. 4A to 4C. In this respect, reference is made to the above description with regard to the similarities, wherein the same and/or corresponding details are provided with the same reference signs.

A special feature of the design according to FIG. 5 is that the return flow element 13 is shorter and opens into the upper region 38 of the reservoir 8. In this case, the outlet opening 14 points in the direction of the baffle wall 16 and is arranged at a small distance therefrom, which can be less than 5 mm, for example. The orifice 11 can accordingly be arranged in a lower portion of the return flow element 13, and can be seated in a bore at the free end of the return flow element. In this implementation, the hydraulic fluid flows through the channel 41 of the return flow element 13 to the orifice 11 and through this at a high flow rate against the baffle 16 into the pressure-free reservoir 8. All other details correspond to the implementation according to FIGS. 4A to 4C, the description of which is referred to in this respect.

FIG. 6A shows a clutch assembly 2 in a further modified embodiment which largely corresponds to the embodiment according to FIGS. 4A to 4C and FIG. 5. In this respect, reference is made to the above description with regard to the similarities, wherein the same and/or corresponding details are provided with the same reference signs.

The basic shape of the return flow element 13 is similar to that shown in FIG. 5, i.e. the return flow element 13 also opens into the upper region 38 of the reservoir 8. A further feature of the implementation shown in FIG. 6A is that the orifice 11 is arranged in an upper portion of the return flow element 13 and that the return flow element 13, which is shown as a detail in FIG. 6B, has a side outlet opening 14. The bore axis of the side opening is perpendicular to the longitudinal axis of the return flow element 13 without being limited thereto. The free end of the return flow element 13 is closed by a closure 40 which is seated in a bore at the end of the return flow element. In this implementation, the hydraulic fluid exiting the orifice 11 impacts the closure 40 at a high flow rate and then flows out through the lateral opening 14 at a low flow rate. The oil flow of the orifice 11 is guided in a controlled manner from the return flow element 13 via the lateral drain bore into the housing chamber, wherein the oil is calmed and channelled. All other details correspond to the implementation according to FIG. 3, the description of which is thus referred to.

An advantage of the clutch assemblies according to the above Figures is that a foaming tendency of the hydraulic fluid is reduced so that the hydraulic pressure remains at least largely constant when the pump 10 is constantly driven. In this way, the actuating force of the friction clutch 3, 3' can be precisely dosed also in the case of prolonged actuation and/or the set torque to be transmitted can be maintained without a drop in pressure. Overall, this results in a fast, precise and targeted torque adjustment for the clutch assembly 2 on the associated driveline and correspondingly high driving stability, in particular also in the case of prolonged actuation of the clutch.

REFERENCE SIGNS 2 clutch assembly
3 friction clutch
4 clutch input part
5 clutch output part
6 actuator assembly
7 housing
8 housing chamber
9 hydraulic fluid
10 hydraulic pump
11 orifice
12 hydraulic chamber
13 return flow element
14 outlet opening
15 motor
16 baffle wall
17 line
18 filter 19 filter
20 piston-cylinder unit
21 line
22, 22' piston
23, 23' pressure member
24, 24' spring
25 input shaft
26 connecting element
27 drive pinion
28 bearing means
29 ring gear
30 intermediate shaft
32 bearing means
33, 33' shaft portion
34, 34' bearing means
35, 35' disk pack
36, 36' axial bearing
37 housing region
38 housing region
39 intake region
40 closure
41 channel
A axis
D diameter
F filling level
n rotary speed
P pressure
t time

The invention claimed is:

1. A clutch assembly for a driveline of a motor vehicle, comprising:
at least one controllable friction clutch for variable torque transmission between a clutch input part and a clutch output part;
a hydraulic actuator assembly for operating the friction clutch, the actuator assembly comprising a hydraulic pump, a hydraulic chamber hydraulically connected to the hydraulic pump and a return flow element with an orifice, via which hydraulic fluid can flow out of the hydraulic chamber into a housing reservoir, wherein the hydraulic fluid defines a filling level in the housing reservoir in an inactive state;
wherein an outlet opening of the return flow element is arranged below the filling level of the hydraulic fluid in the inactive state.

2. The clutch assembly according to claim 1, wherein a lubricant is provided for at least one of lubricating and cooling the controllable friction clutch, with the lubricant of the friction clutch and the hydraulic fluid of the actuator assembly being different fluids which are hydraulically separated from each other.

3. The clutch assembly according to claim 1, wherein the outlet opening of the return flow element lies in a lower region of the housing reservoir that is at least ten millimeters below the filling level of the hydraulic fluid.

4. The clutch assembly according to claim 1, wherein a flow velocity in the return flow element in a region of the orifice plate is greater than sixty meters per second and a low velocity behind the orifice is less than or equal to thirty meters per second.

5. The clutch assembly according to claim 1, wherein a pressure drop in the return flow element between the orifice and the outlet opening is less than five bar.

6. The clutch assembly according to claim 1, wherein a volume of the hydraulic fluid in the housing reservoir in the inactive state is less than four-hundred milliliters and more than two-hundred millimeters.

7. The clutch assembly according to claim 1, wherein, when actuated, the hydraulic pump conveys hydraulic fluid to a setting unit of the friction clutch to act thereupon in a closing direction, and, in the non-actuated state, hydraulic fluid can flow from the setting unit back into the housing reservoir, so that the friction clutch is opened.

8. The clutch assembly according to claim 1, wherein the return flow element is tubular and includes a channel, wherein the orifice is arranged in the return flow element.

9. The clutch assembly according to claim 8, wherein the channel has a diameter which is at least three times as large as a smallest opening diameter of the orifice.

10. The clutch assembly according to claim 8, wherein the return flow element has a lateral outlet opening which branches off laterally from the channel.

11. The clutch assembly according to claim 10, wherein the orifice is arranged in the channel above the lateral outlet opening, and a closure is provided at the end of the channel below the lateral outlet opening.

12. The clutch assembly according to claim 11, wherein the length of the channel between the orifice and the closure is at least twice as long as the diameter of the channel or of the outlet opening.

13. The clutch assembly according to claim 1, wherein the orifice is arranged in a bore at a free end of the return flow element.

14. The clutch assembly according to claim 1, wherein the hydraulic pump is designed to generate a hydraulic pressure of more than 25 bar.

15. The clutch assembly according to claim 1, wherein the housing reservoir is reduced downwards in the installed state of the clutch assembly, so that a horizontal cross-sectional area in a lower region of the housing reservoir is smaller than a horizontal cross-sectional area in an upper region of the housing reservoir.

16. The clutch assembly according to claim 1, wherein the outlet opening of the return flow element is orientated in a direction towards a housing wall, with a distance between the outlet opening and the housing wall being between 1 mm and 5 mm.

17. The clutch assembly according to claim 1, wherein a first controllable friction clutch is provided for transmitting a first torque to a first side shaft, and a second controllable friction clutch is provided for transmitting a second torque to a second side shaft.

* * * * *